United States Patent
Seidenberg et al.

(10) Patent No.: US 10,587,597 B1
(45) Date of Patent: Mar. 10, 2020

(54) DATA EXFILTRATION CONTROL

(71) Applicant: Amazon Technologies, Inc., Seattle, WA (US)

(72) Inventors: Benjamin Elias Seidenberg, Seattle, WA (US); Gregory Alan Rubin, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 431 days.

(21) Appl. No.: 15/176,048

(22) Filed: Jun. 7, 2016

(51) Int. Cl.
*H04L 29/06* (2006.01)

(52) U.S. Cl.
CPC .............. *H04L 63/08* (2013.01); *H04L 63/10* (2013.01)

(58) Field of Classification Search
CPC ................................ H04L 63/08; H04L 63/10
See application file for complete search history.

(56) References Cited

U.S. PATENT DOCUMENTS

| | | | |
|---|---|---|---|
| 8,281,382 B1* | 10/2012 | Sanyal | H04L 67/22 726/9 |
| 2004/0260804 A1* | 12/2004 | Grabarnik | H04L 29/06 709/224 |

* cited by examiner

*Primary Examiner* — Simon P Kanaan
(74) *Attorney, Agent, or Firm* — Davis Wright Tremaine LLP

(57) ABSTRACT

A service includes an associated service request throttling system. The throttling system constrains the rate at which service requests are fulfilled by the service, and also provides throttling information to the service. The throttling system controls service throughput by implementing a throttling bucket. The throttling bucket has an associated bucket level which indicates, to the service, an amount of service requests that can be satisfied before throughput limitations are imposed by the throttling system. The bucket level may be modified in response to service requests, service request characteristics, or environmental parameters. In some examples, operational parameters of the throttling system may be configured by users of the service to constrain data exfiltration. The bucket level itself may be used by the service to expand or constrain access privileges granted to particular users.

20 Claims, 12 Drawing Sheets

DATA EXFILTRATION CONTROL

BACKGROUND

Many businesses have adopted the use of remote services such as Internet-based backup, storage, and computing services as a way to fulfil their growing need for computing resources. As the use of remote and online services has increased, certain security risks have become a growing concern. One problem of particular concern is data exfiltration. Data exfiltration is the unauthorized transfer of data from a computer system, network, or secure domain. Detecting and limiting data exfiltration can be a difficult problem because many conventional data exfiltration detection systems rely on a period of observation and analysis before detecting and halting the exfiltration of data. During the observation and analysis time, significant amounts of data may be transferred from within the computer system.

BRIEF DESCRIPTION OF THE DRAWINGS

Various techniques will be described with reference to the drawings, in which.

DETAILED DESCRIPTION

Figure 1:
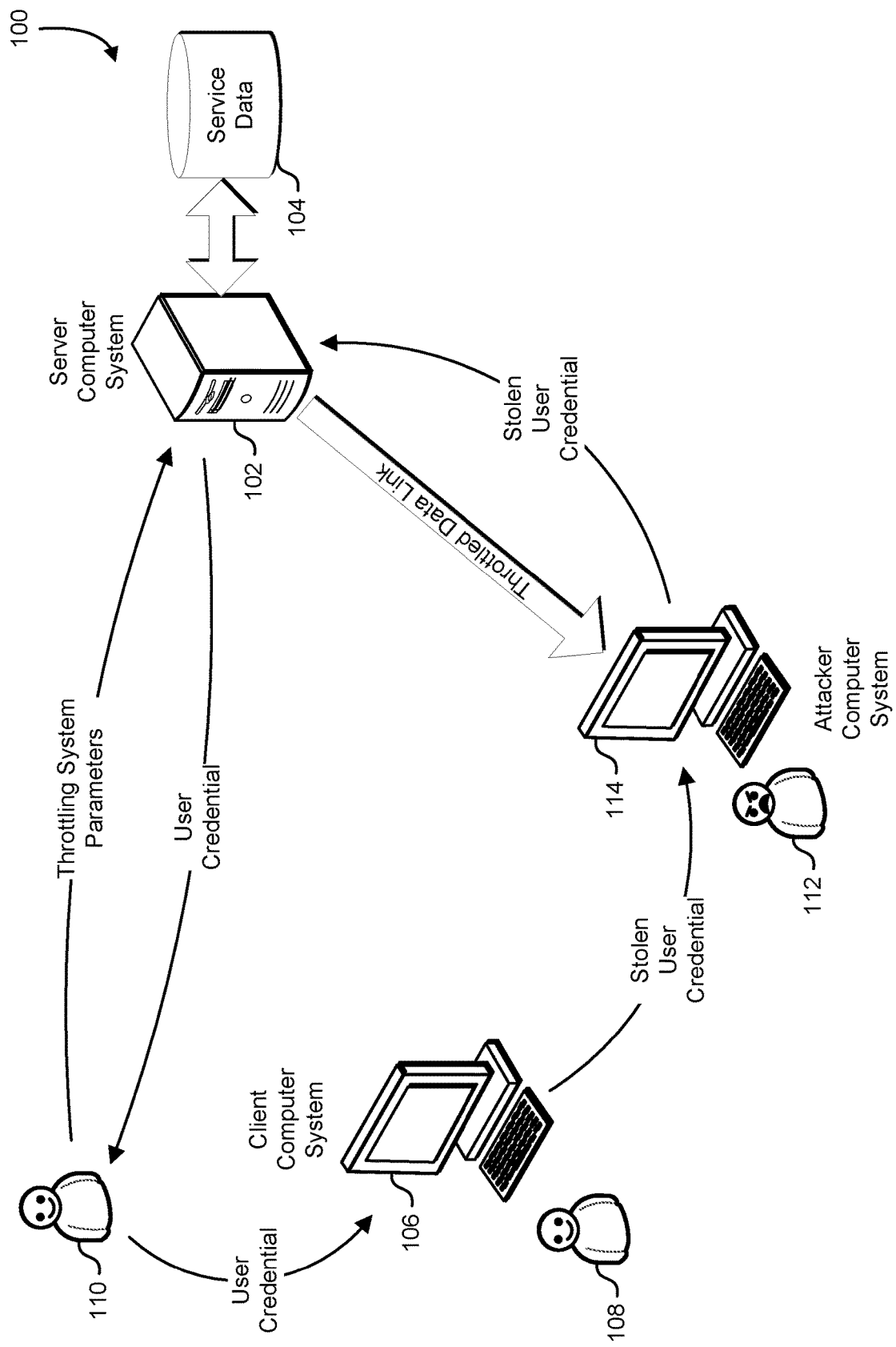
FIG. 1 shows an illustrative example of an environment in which various embodiments may be practiced.

The current document describes a service that mitigates data exfiltration by utilizing a throttling system. The throttling system limits the rate at which service requests are fulfilled by the service, and also provides information usable by the system to modify access privileges granted to one or more client computer systems. The throttling system controls service throughput by implementing a throttling bucket. The throttling bucket has an associated bucket level which indicates, to the service, an amount of service requests that can be satisfied before throughput limitations are imposed by the throttling system. The bucket level is updated over time in response to a net amount of bucket-draining events such as fulfilled service requests and bucket-filling events such as periodic recovery events.

In one example, the throttling bucket is filled over time to a maximum level as a result of a number of periodic recovery events. As service requests are fulfilled by the service, the throttling system assigns a throttling cost associated with each fulfilled request, and drains a corresponding amount from the throttling bucket. If the level of the throttling bucket is insufficient to fulfill a service request, fulfillment of the service request is delayed until the level of the throttling bucket is sufficiently recovered. The throttling cost assigned to a particular service request can be dependent on a number of factors such as the complexity of the particular service request, the time the particular service request is received, the credentials used to authorize the service request, particular data accessed by the particular service request, and authentication methods used to authorize the particular service request.

Users of a service may define operational parameters of the throttling system as a means to constrain potential data exfiltration. In one example, when a user is granted credentials for accessing a service, the user submits a set of throttling system parameters to the throttling system for use when the credentials are used. Credentials can be of a variety of types such as username/password pairs, biometric measurements such as fingerprints, retina scans, and voice prints, digital certificates, or electronic keys. The throttling system parameters are chosen by the user so that they are in accordance with the user's typical service usage. If an attacker compromises the user's account, and attempts to exfiltrate substantial amounts of data, the throttling system parameters will constrain the amount of data exfiltrated to an amount in accordance with the user's typical service usage, as defined by the user with the throttling parameters. By giving control over the throttling parameters to the user, the throttling system can be better adapted to each user's typical pattern of service use thereby increasing the effectiveness of the throttling system. In an attack scenario, the throttling system may slow data exfiltration allowing additional time to detect and thwart the attack.

In some implementations, operational parameters of the throttling system are provided by an account administrator, and the operational parameters are applied to a number of subordinate accounts managed by the administrator. In one example, an administrator creates an online resource managed by a service, and defines a set of operational parameters for a throttling system that limits access to the service. A set of subordinate user accounts are created by the administrator, and the subordinate user accounts are used by other individuals to access the online resource. The throttling parameters defined by the administrator are applied to each of the set of user accounts by the throttling system.

The operational parameters of the throttling system may include parameters that modify the operation of the throttling system itself. Examples of throttling parameters that modify the operation of the throttling system itself include the size of the throttling bucket, and throttling bucket fill and drain multipliers. Throttling bucket fill in drain multipliers multiply the effect of bucket fill and bucket draining events. Bucket drain and bucket filled multipliers may be altered over time in response to events and environmental conditions such as time of day, system load, available computing resources, number of active users, and the presence of particular security protocols.

The throttling system may be configured so that a variety of events increase or decrease the level of the throttling bucket. Events that alter the level of the throttling bucket may include periodic bucket fill and drain events, fulfillment of various types of service requests, the use of particular security protocols when submitting a service request, receiving confirmation of a service request from a higher authority, or receiving corroborating service requests from other sources. In some examples, a throttling bucket associated with one service may be filled or drained in response to a service request submitted to or fulfilled by another service.

For example, an e-commerce system may include a billing service and a shipping service. In general, when an order is shipped, a corresponding bill is processed by the billing service. A throttling system connected to the billing service can enforce this balance by draining a throttling bucket when a bill is processed by the billing service, and filling the throttling bucket when a shipping request is processed by the shipping service. Periodic time-based refill of the throttling bucket may allow for some imbalance between billing and shipping requests. If an attacker compromised the billing system, and attempted to submit falsified billing requests, the throttling system associated with the billing service would detect the imbalance between billing requests and shipping requests and limit request processing by the billing service.

Information provided by the throttling system may be used by a service to modify service access privileges granted to users of the service. For example, a throttling bucket level may be used to increase or decrease the amount of service access privileges granted to a particular user. In some examples, access privileges granted to a particular user are decreased as the throttling bucket level decreases. If an attacker compromises the particular user's account, and attempts to exfiltration large amounts of data from the service, the throttling bucket associated with the service will be quickly drained. In response to the decrease in the throttling bucket level, the service will reduce the access privileges granted to the particular user. Access to sensitive or high risk data may be constrained or eliminated. In another example, access privileges granted to a particular user art increased as the throttling bucket level increases. If, for example, a user needs to perform a particularly disruptive operation such as deleting a database table, or shutting down the service, the service may provide the necessary access privileges only when the throttling bucket level is very high because a high throttling bucket level indicates that the service is under a very light load. In yet another example, as the throttling bucket of a set of high-privilege users is drained, additional privileges are granted to a set of lower-privilege users. The set of lower-privilege users are granted the additional privileges for the purpose of offloading work currently performed by the high-privilege users. This arrangement allows for the automatic adjustment of privilege levels.

FIG. 1 shows an illustrative example of an environment in which various embodiments may be practiced. An environment 100 includes a server computer system 102 that makes a service available to one or more clients over a computer network. The server computer system 102 provides the service to client computer systems via a computer network. The server computer system 102 is connected to a data store 104 that contains service data. The service data may include sensitive information such as personal customer information, financial information, medical records, or security information such as passwords and cryptographic keys.

The server computer system 102 includes a throttling system. The throttling system limits the rate at which the server computer system 102 is able to fulfill service requests submitted by service users. The throttling system is able to proportionally control the rate at which service requests are fulfilled. For example, if 100 service requests are received by a service provider, the throttling system may be used to fulfill the 100 service requests over an amount of time to avoid overwhelming the resources of the service provider. In general, the throttling system constrains the rate at which service requests are fulfilled without stopping the fulfillment of requests. The throttling system operates according to a set of operational parameters. The operational parameters of the throttling system may be defined by service users or account managers so that data exfiltration is mitigated. In the example shown in FIG. 1, a client computer system 106 is operated by an authorized user 108. The authorized user 108 is provided with a set of credentials by an account manager 110. The account manager 110 provides a set of throttling system parameters to the server computer system 102. The throttling system parameters are configured by the account manager 110 in accordance with the expected usage of the service by the authorized user 108. The server computer system 102 uses the throttling system parameters to configure the throttling system. So long as the authorized user 108 accesses the service via the client computer system 106 in accordance with the expected usage of the authorized user 108, the throttling system will not substantially constrain the processing of service requests submitted by the authorized user 108. In additional implementations, the throttling parameters may be provided by the authorized user 108, a subordinate administrator, or by an entity that owns or controls customer data on the data store 104. In some examples, the throttling parameters are set by an entity not under the control of the service provider.

However, if an attacker 112 obtains the credentials of the authorized user 108, the attacker 112 may attempt to extract substantial amounts of service data from the server computer system 102 via an attacker computer system 114. In general, an attempt to extract substantial amounts of service data from the server computer system 102 will exceed the expected service usage of the authorized user 108. The throttling system will constrain the ability of the attacker 112 to access the service in accordance with the expected service usage of the authorized user 108. As a result, the attack may be delayed, providing more time to detect and thwart the attack.

Figure 2:
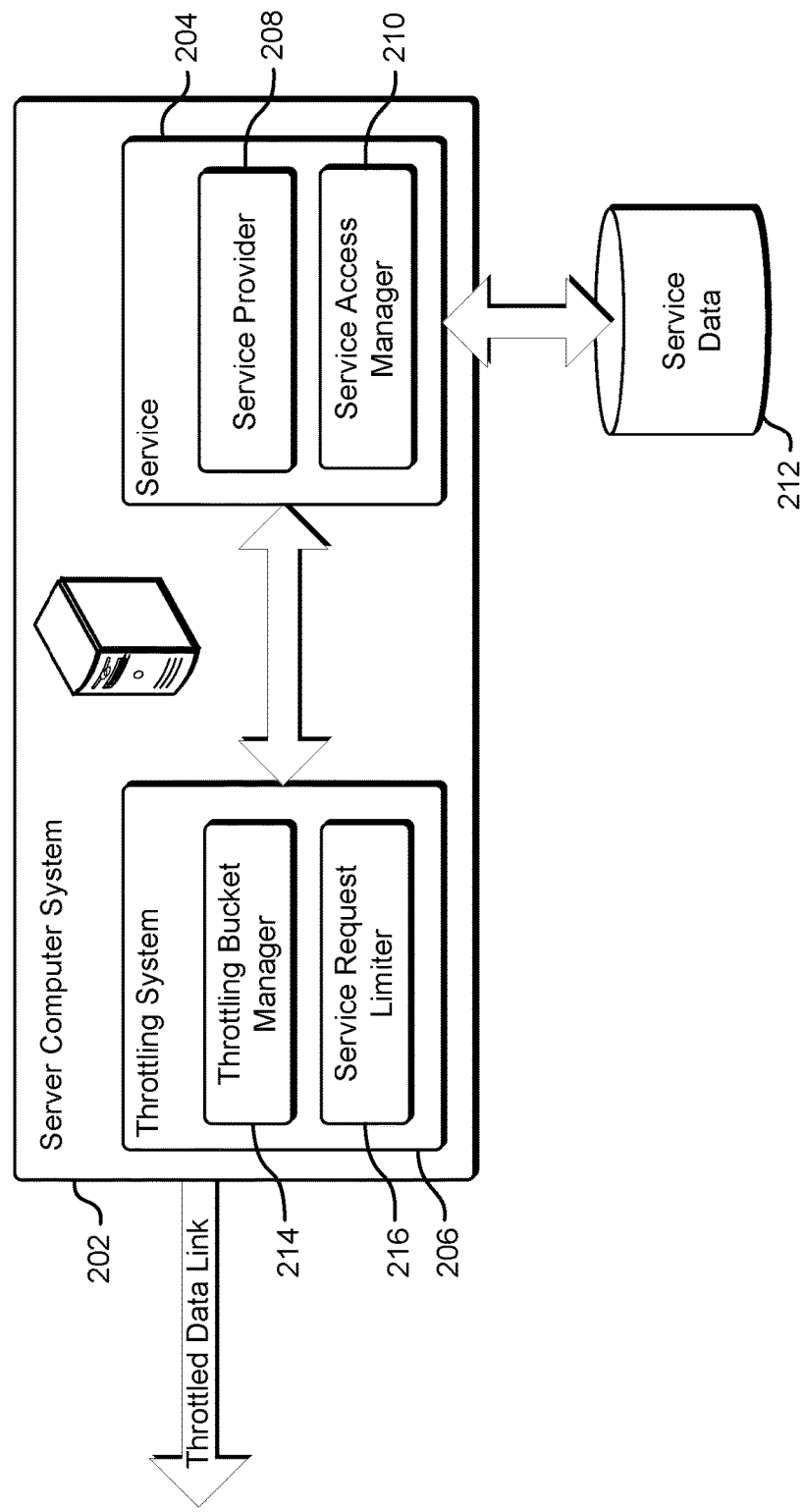
FIG. 2 shows an illustrative example of a server computer system that provides access to a service via a throttling system.

FIG. 2 shows an illustrative example of a server computer system that provides access to a service via a throttling system. A diagram 200 shows a server computer system 202 that provides a throttled service to one or more clients of the service. In some examples, the server computer system 202 is a virtual computer system or server cluster. In another example, the server computer system 202 is comprised of a plurality of computer systems a first portion of which provide the service, and a second portion of which perform throttling operations that limit the fulfillment of service requests.

The server computer system 202 includes a service 204 connected to a throttling system 206. The service 204 includes a service provider 208 and a service access manager 210. The service provider 208 implements logic associated with providing the service to client computer systems. In various examples, the service provider 208 may implement an online storage service, a cryptography service, a cloud computing service, a networking service, or a transaction processing service. The service access manager 210 manages access to the service by issuing credentials to authorized users of the service, and managing the service access privileges associated with those credentials. In some examples, the service access manager 210 issues usernames and passwords to authorized users or account managers. In another example, the service access manager 210 issues digital certificates to authorized users or account managers. In yet another example, the service access manager 210 issues cryptographic keys used to access the service. The service 204 is connected to a data store 212 that retains service data used to fulfill service requests.

Service requests are received by the service 204 via the throttling system 206. The throttling system 206 includes a throttling bucket manager 214 and a service request limiter 216. The throttling bucket manager 214 maintains a throttling bucket with an associated throttling bucket level. The level of the throttling bucket is increased in response to bucket-filling events such as periodic filling events, corroborating service requests, supplementary authentication events, and confirmation events. The level of the throttling bucket is decreased in response to bucket-draining events such as the fulfillment of service requests, authentication failure events, and sensitive data access events. As the throttling bucket is filled, the level of the throttling bucket is limited to a maximum bucket level. As the throttling bucket is emptied, the level of throttling bucket is not allowed to be less than zero. The service request limiter 216 controls the reception of service requests by the server computer system 202 by assigning a throttling metric to each received service request, causing the throttling bucket manager 214 to update the throttling bucket in accordance with the assigned throttling metric, and if appropriate, delaying the service request until the throttling bucket attains a level sufficient to fulfill the service request.

In one example, a service request is received by the server computer system 202 from an authorized user. The service request limiter 216 receives the service request and determines a throttling metric for the service request. The throttling system 206 updates the level of the throttling bucket, and compares the level of the throttling bucket to the throttling metric of the service request. If the throttling bucket level is not sufficient to fulfill the service request, the throttling system 206 retains the service request in a request queue and waits for the throttling bucket manager 214 to indicate that the bucket level is sufficient to fulfill the service request. If the throttling bucket level is sufficient to fulfill the service request, the throttling system 206 causes the throttling bucket manager 214 to update the throttling bucket by subtracting the throttling metric for the service request from the bucket level, and forwards the service request to the service 204.

The authorized user, or an account manager associated with the authorized user, may provide, to the throttling system 206, a set of throttling parameters that configure the throttling system 206. The throttling parameters may include the size of the throttling bucket, a rate at which the throttling bucket recovers, as well as other factors that define how a throttling metric is determined for a service request. In some examples, throttling metrics are determined for a service request using a lookup table. The lookup table specifies a base throttling metric based at least in part on a type of the service request, a parameter factor, and a result factor. The throttling metric of a particular request of a particular type is determined by adding the base throttling metric for the particular type, to an amount of service request parameters times the parameter factor for the type of service request, and an expected amount of service request results times the result factor for the type of service request.

| Service Request Type | Base Throttling Metric | Parameter Metric | Result Metric |
|---|---|---|---|
| Store Data | 20 | 10 | 1 |
| Retrieve Data | 10 | 1 | 3 |
| Rename File | 20 | 0 | 0 |

For example, if the throttling system is configured with throttling parameters in accordance with the above table, a request to retrieve 40 bytes of data from the service would have a throttling metric of 130 (10+(0×1)+(40×3)). A request to store 100 bytes of data would have a throttling metric of 1020 (20+(100×10)+(0×1)).

Figure 3:
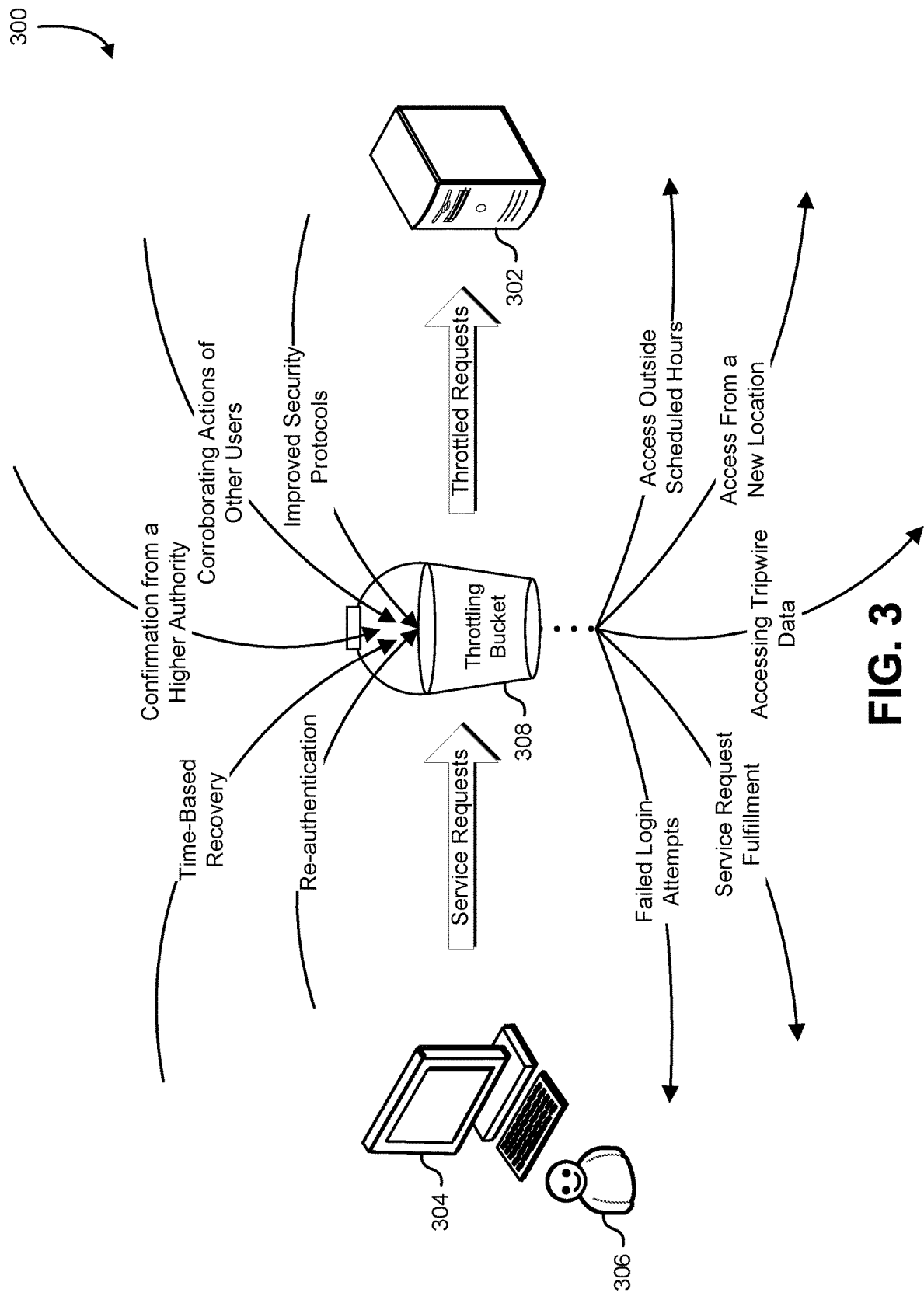
FIG. 3 shows an illustrative example of a throttling system that maintains a throttling bucket for a service.

FIG. 3 shows an illustrative example 300 of a throttling bucket used by a throttling system associated with a service. The server computer system 302 provides a service to a client computer system 304 which is operated by an authorized user 306. The server computer system includes a throttling system that maintains a throttling bucket 308. Service requests are sent by the authorized user 306 using the client computer system 304 to the server computer system 302. The throttling system receives the service requests, and constrains the fulfillment of the service request based at least in part on the level of the throttling bucket 308. If the level of the throttling bucket 308 is sufficient to allow fulfillment of the service request, the service request is forwarded by the throttling system to the service on the server computer system 302. If the level of the throttling bucket 308 is not sufficient to allow for fulfillment of the service request, the service request is delayed by the throttling system until the level of the throttling bucket 308 is sufficient. In some implementations, the service request is delayed by placing the service request in a queue maintained by the throttling system. In another implementation, the service request is rejected by the throttling system, and the client computer system 304 resends the service request after the level of the throttling bucket 308 has recovered.

In the example shown in FIG. 3, the throttling bucket 308 is filled based at least in part on a variety of bucket filling components including a re-authentication component, a time-based recovery component, a confirmation component, a corroboration component, and an improved security component. The re-authentication component may be added to the throttling bucket 308 in response to the authorized user 306 providing a valid digital certificate, username and password, or biometric authentication to the server computer system 302. In some examples, the credentials and authentication techniques provided by the requester are used to determine a strength metric for the authentication, and the strength metric is used to derive, at least in part, the re-authentication component. For example, a biometric credential may be assigned a higher strength metric than a username and password combination. The time-based recovery component may be added to the throttling bucket 308 periodically over time, or based on an amount of time elapsed. For example, the time-based recovery component may be 10 counts per second. The confirmation component may be added to the throttling bucket 308 when a higher authority such as an account manager confirms actions requested by the authorized user 306. In some examples, the confirmation is sent by the account manager in response to a confirmation request sent by the authorized user 306. In another example, the throttling system requests a confirmation from the account manager when the throttling bucket level reaches zero (or other predetermined minimum threshold value). A corroborating component may be added to the throttling bucket 308 when actions performed by other authorized users or account managers corroborate and are in accordance with service requests submitted by the authorized user 306. In one example, a corroborating component is added to the throttling bucket 308 when requests similar to the request submitted by the authorized user 306 are submitted by peers within the same workgroup as the authorized user 306. In another example, a corroborating component is added to the throttling bucket 308 when a complementary service request is received from any user. For example, if the authorized user 306 is processing payments, and another authorized user is processing shipments, the throttling system may be configured to expect a shipment request for each payment request. When the throttling system receives a payment request from the authorized user 306, and then receives a corroborating shipment request from the other authorized user, a corroborating component is added to the throttling bucket 308. An improved security component may be added to the throttling bucket 308 when the authorized user 306 employs various security protocols. For example, an improved security component may be added when the authorized user sends a service request over a secure TLS connection. In another example, an improved security component may be added to the throttling bucket 308 and the authorized user 306 provides a proper digital signature with the service request. Additional throttling bucket fill components may be used by the throttling system.

The throttling bucket 308 is drained based at least in part on a variety of bucket draining components including a failed authentication component, a request fulfillment component, a data tripwire component, a request geolocation component, and a temporal component. A failed authentication component may be subtracted from the throttling bucket 308 if the authorized user 306 provides incorrect credentials when authorizing a service request. The incorrect credentials may be an incorrect password or username, and invalid digital certificate, or an incorrect cryptographic key. A request fulfillment component may be subtracted from the throttling bucket 308 once a service request is fulfilled by the server computer system 302. The amount subtracted from the throttling bucket 308 may be based at least in part on the type of the service request, the parameters provided with the service request, and the expected results of the service request. A data tripwire component may be subtracted from the throttling bucket 308 if particular data or particular requests are submitted to the server computer system 302. For example, an account manager may configure certain data entries, data tables, or request types as tripwires. If a tripwire data entry, data table or request type is accessed by a user, the throttling system subtracts a data tripwire component from the throttling bucket 308. Tripwire components may be placed on data or resources not normally used by authorized users. Activation of tripwire components may indicate that the system is under attack. In some implementations, activation of a tripwire component will cause the throttling bucket 308 to be completely drained, and may cause the size of the throttling bucket 308 to be reduced. If the throttling system detects that a service request has been submitted from a location not previously used by the authorized user 306, a geolocation component may be subtracted from the throttling bucket 308. If the throttling system detects that a service request has been submitted outside the expected work hours of the user that submitted the request, a temporal component may be subtracted from the throttling bucket 308. The throttling system may be provided with the expected work hours of the user by the user themselves or by an account manager, as part of the throttling system parameters.

Figure 4:
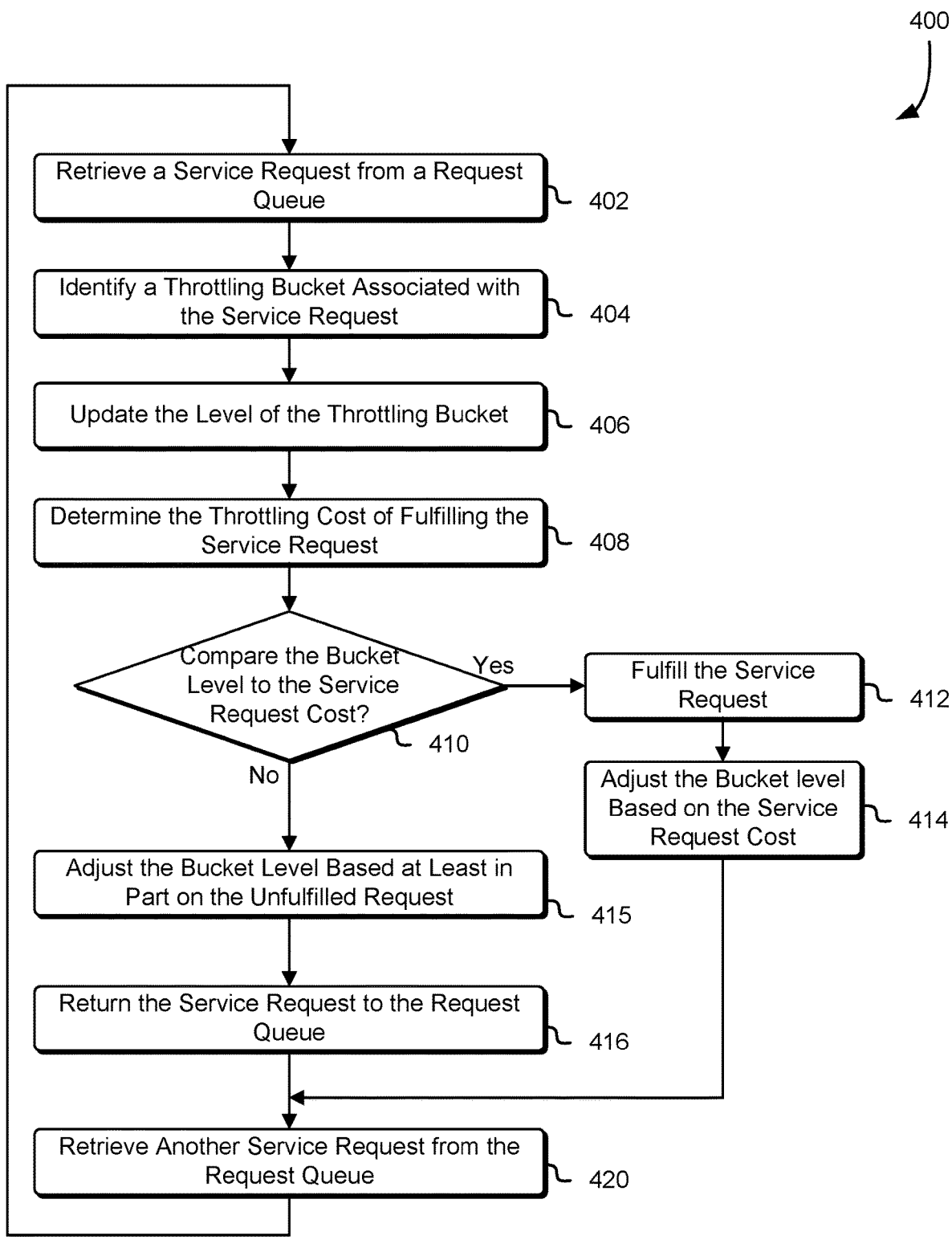
FIG. 4 shows an illustrative example of a process that, as a result of being performed by a service, fulfills service requests in accordance with limitations imposed by a throttling system.

FIG. 4 shows an illustrative example of a process that, as a result of being performed by a service, fulfills service requests in accordance with limitations imposed by a throttling system. A process diagram 400 shows a process performed by a service and an associated throttling system that begins at block 402. At block 402, the throttling system retrieves a service request from a request queue. The request queue holds service requests that have been received from client computer systems. At block 404, the throttling system identifies a throttling bucket associated with the service request. In some examples, the throttling bucket is identified based at least in part on the credentials used to submit the service request. In another example, the throttling bucket is identified based at least in part on the resources accessed by the service request. In yet another example, the throttling bucket is identified based at least in part on the type of service request. In yet another example, throttling bucket is identified based on a combination of the above factors. At block 406, the throttling system updates the level of the throttling bucket in accordance with pending bucket drain components and bucket fill components. Examples of bucket drain components and bucket fill components are shown at least in FIG. 3, FIG. 5, and FIG. 6.

At block 408, the throttling system determines the throttling cost associated with fulfilling the service request. The throttling cost may be based at least in part on a throttling metric determined for the service request. At decision block 410, if the level of the throttling bucket is able to accommodate the throttling cost of fulfilling the service request, execution proceeds to block 412 and the service request is fulfilled. If the service request is fulfilled, the throttling bucket is adjusted 414 based at least in part on the throttling cost of fulfilling the service request. If the level of the throttling bucket is not able to accommodate the throttling cost of fulfilling the service request, execution proceeds to block 415 and the level of the throttling bucket may be adjusted by an amount based at least in part on the service request having not been fulfilled. In some examples, as a result of the level of the throttling bucket not being able to accommodate the throttling cost of fulfilling the service request, the throttling system is configured so that the rate at which service requests may be fulfilled is reduced. For example, the size of the throttling bucket may be reduced or a time-based bucket refill component may be reduced so that the rate of fulfillment of service requests is reduced. Recovery from the reduced service-request-fulfillment rate may be facilitated by the throttling bucket level being maintained below a threshold value for an amount of time, after which the size of the throttling bucket and the time-based bucket refill component may be restored to their previous values. At block 416, the service request is returned to the request queue.

In some examples, the system waits for an amount of time to allow the throttling bucket to recover to a level sufficient to satisfy the service request. In some implementations, the system waits for a fixed amount of time before proceeding to block 420. In another implementation, the system is notified by the throttling system when the throttling bucket recovers to a specified level. At block 420, the throttling system returns to block 402 to retrieve an additional service request from the request queue. The additional service request may be a service request previously returned to the request queue or a new request received from a client computer system.

Figure 5:
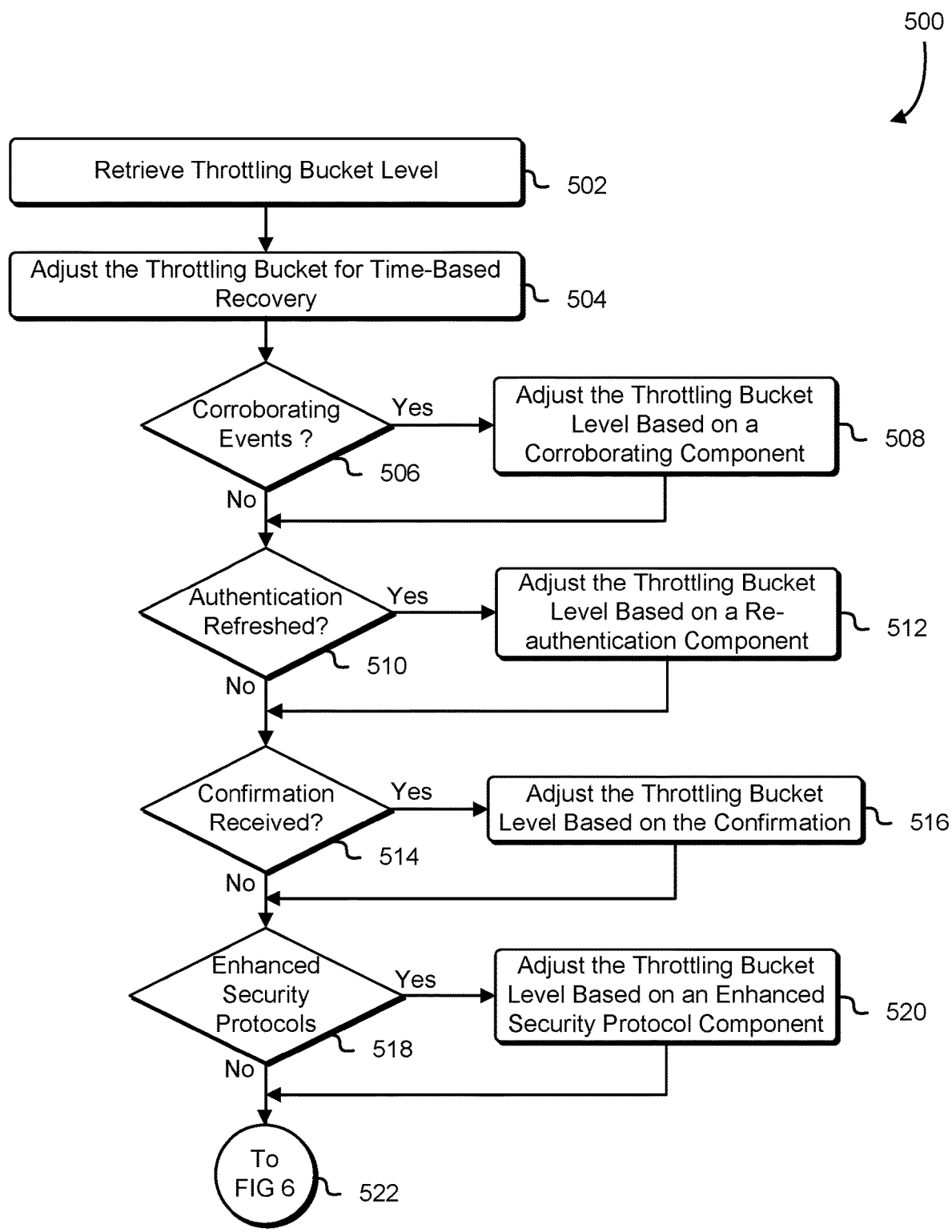
FIG. 5 shows an illustrative example of a first part of a process that, as a result of being performed by a service, updates a throttling bucket level in response to a number of events.

FIG. 5 shows an illustrative example of a first part of a process that, as a result of being performed by a service, updates a throttling bucket level in response to a number of events. A process diagram 500 illustrates a process for updating a throttling bucket level that begins at block 502. At block 502, the throttling system retrieves a throttling bucket level to be updated. The throttling bucket level may be represented by an integer or floating-point value that is constrained within a predefined range. In some examples, the bucket level may range between zero and a maximum bucket size.

At block 504, the throttling service modifies the throttling bucket based at least in part on a time-based recovery component. In some examples, the time-based recovery component is a constant value or a fixed percentage of the maximum size of the throttling bucket. In another example, the time-based recovery component is a percentage of the amount that the throttling bucket is empty. For example, the time-based recovery component may be 10% of the amount that the throttling bucket is empty. If the throttling bucket is completely empty, the time-based recovery component would be 10% of the total bucket size. If the throttling bucket is 90% full, the time-based recovery component would be 1% of the total bucket size.

Beginning at block 506, the throttling system modifies the throttling bucket based at least in part on a number of recovery elements. At block 506, the throttling system determines whether a corroborating event has occurred for the throttling bucket. Corroborating events may be discovered by examining service request queues or history logs associated with the service, or service request queues or history logs associated with other services. In some implementations, corroborating events are identified by determining unexpected mixture of event types. For example, a particular system might exhibit a behavior where data is read, modified by the client, and then rewritten to storage service. For a read event, a write event may be deemed as a corroborating event since a write is expected for every read. If the throttling system determines that a corroborating event has occurred, execution advances to block 508 and the throttling system modifies the throttling bucket based at least in part on a corroborating-event component.

At decision block 510, the throttling system determines whether fresh authentication information has been submitted by the requester with recent service requests. In one example, the throttling system periodically requests re-authentication of the user's credentials. If the user submits correct credentials to the throttling system, an authentication refresh event is logged as a result, when the throttling bucket is updated, a re-authentication component is added to the throttling bucket. If the throttling system determines that the requester has submitted fresh authentication information, execution proceeds to block 512 and the throttling system modifies the throttling bucket based at least in part on a re-authentication component.

At decision block 514, the throttling system determines whether confirmation has been received by an account manager. In some implementations, the throttling system requests confirmation of previous activity from an account manager associated with the parties submitting service requests. A confirmation may be requested as a result of activity that causes the throttling bucket to fall below a threshold level, or in some implementations, as a result of the throttling bucket becoming empty. The account manager reviews system logs maintained by the throttling system, and determines whether the logged activity is in accordance with expected service use. If the logged activity is in accordance with expected service use, the account manager may submit a confirmation event to the throttling system to indicate that the logged service use is within expected norms. If the throttling system receives such a confirmation event, execution proceeds to block 516 where the throttling bucket is modified. In some examples, a confirmation component may be added to or subtracted from the level of the throttling bucket.

At decision block 518, the throttling system examines the security protocols used to submit the service request. If preferred security protocols are used when submitting service requests, the throttling system may reward the requester by adding an enhanced-security component to the throttling bucket in one example, if a requester submits a service request over an unencrypted TCP/IP connection, the throttling system does not add an enhanced-security component to the throttling bucket. However, if the requester submits a service request over a secure TLS connection, the throttling system will add an enhanced-security component to the throttling bucket. In another example, requests are submitted over a TLS connection, and authenticated at least in part using a digital certificate. If the digital certificate is signed by a certificate authority trusted by the throttling system, an enhanced-security component will be added to the throttling bucket. If the digital certificate is not signed by certificate authority trusted by the throttling system, an enhanced-security component will not be added to the throttling bucket. If the throttling system determines that an enhanced-security protocol has been used, execution proceeds to block 520 and the throttling bucket is modified based at least in part on an enhanced-security component.

Components may be used to modify the throttling bucket in several ways. In some implementations, components are a fixed value added to the level of the throttling bucket. In another implementation, components are a percentage of the bucket size added to the level of the throttling bucket. The process of updating the throttling bucket continues in FIG. 6, as indicated at connection circle 522.

Figure 6:
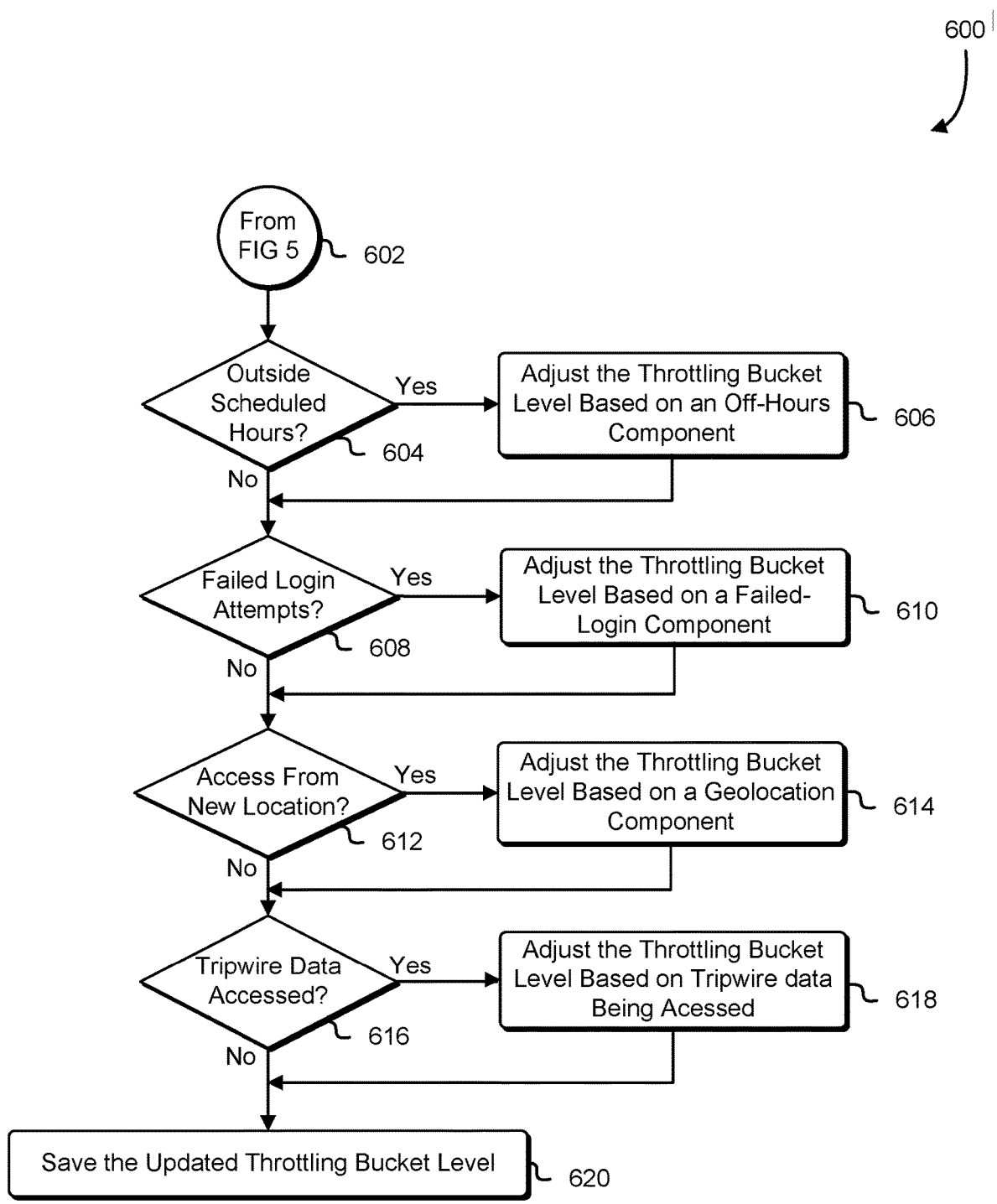
FIG. 6 shows an illustrative example of a second part of a process that, as a result of being performed by a service, updates a throttling bucket level in response to a number of events.

FIG. 6 shows an illustrative example of a second part of a process that, as a result of being performed by a service, updates a throttling bucket level in response to a number of events. A process diagram 600 shows a process of updating the throttling bucket that continues from FIG. 5 at connection circle 602. In the portion of the process shown in FIG. 6, a number of bucket-draining events are processed and, as a result, the level of the throttling bucket is generally decreased.

At decision block 604, the throttling system determines whether a request has been made outside the scheduled working hours of the associated requester. The scheduled working hours of the associated requester may be submitted with the throttling parameters provided by the service user, or by an account administrator. The throttling system may evaluate service requests as they arrive at the throttling system, from request queues maintained by the throttling system, or by examining log files that record previous service requests. If the throttling system determines that a request has been made outside the scheduled working hours of the associated requester, execution proceeds to block 606 and the throttling system adjusts the throttling bucket level based at least in part on an off-hours component.

At decision block 608, the throttling system determines whether there has been a failed login attempt to the service. In some examples, the throttling system determines there has been a failed login attempt after three consecutive incorrect sets of credentials have been submitted to the service by a particular user. In another example, the throttling system determines there has been a failed login attempt when a correct biometric factor is not submitted with the login credentials. In yet another example, the throttling system determines there has been a failed login attempt when a password reset request is received by the service. If the throttling system determines that there has been a failed login attempt to the service, execution proceeds to block 610 and the throttling system adjusts the throttling bucket level based at least in part on a failed-login component.

At decision block 612, the throttling system determines whether a service request has been received from a location not generally associated with the requester's past pattern of service use. The throttling system may evaluate service requests as they arrive at the throttling system, from request queues maintained by the throttling system, or by examining log files that record previous service requests. For each service request, the throttling system identifies an associated requester. Locations associated with a particular requester can be specified in a number of ways. In some examples, locations of a particular requester are configured as a throttling parameter supplied by the requester or an account manager of the requester. In another example, locations of a particular requester are learned over time. After a particular location is used for an amount of time, the particular location is associated with the requester. In yet another example, the throttling system queries the location of the requester through a location service such as tracking the requester's cell phone location. If the location of the requester determined by tracking the requester's cell phone does not match the location determined by examining the received request, the throttling system determines that the origin of the request is not generally associated with the requester. If the throttling service determines that the service request has been received from a location not generally associated with the requester, the throttling service adjusts 614 the throttling bucket level based at least in part on a geolocation component.

At decision block 616, the throttling system determines whether tripwire data has been accessed. Tripwire data may be a service request having particular characteristics, or a particular data element maintained by the service that is not used during expected operations. An attacker, being unfamiliar with the expected operation of the service, may inadvertently access the tripwire data thereby causing the throttling system to reduce the level of the throttling bucket, and slow the attacker. If the throttling system determines that tripwire data has been accessed, execution proceeds to block 618 and the throttling bucket modified. In some examples, additional steps may be taken such as reducing the size of the throttling bucket in response to the events described above.

In some implementations, components that add or subtract to the throttling bucket level may take the form of a multiplication factor applied to the throttling cost of the request. In yet another implementation, some components may be modified to multiply the effect of other components. For example, if an insecure protocol is used to submit a request, the cost of the request may be multiplied by a factor associated with the use of an insecure protocol. At block 620, after the throttling bucket level has been modified in accordance with the above factors and components, the updated throttling bucket level is saved.

Figure 7:
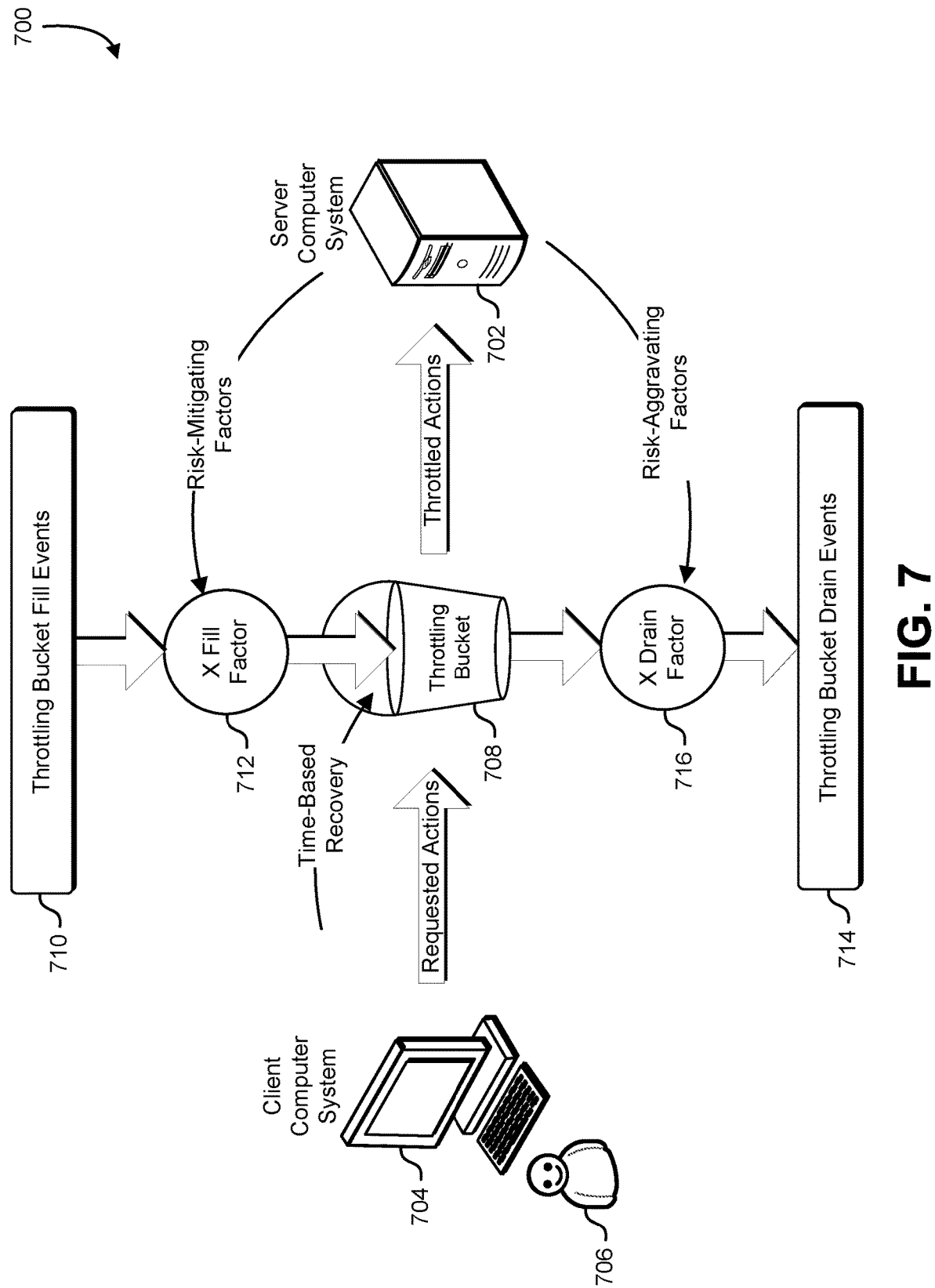
FIG. 7 shows an illustrative example of a throttling system that modifies the fill and drain rates of a throttling bucket based on a number of risk-mitigating and risk-aggravating factors.

FIG. 7 shows an illustrative example of a throttling system that modifies the fill and drain rates of a throttling bucket based on a number of risk-mitigating and risk-aggravating factors. An environment 700 includes a server computer system 702 that provides a service to a client computer system 704 operated by an authorized user 706. In some implementations, the server computer system 702 is a server cluster, a virtual machine, or an online service-hosting environment. The client computer system 704 may be a personal computer, a handheld device, a cell phone, or other computing appliance. The authorized user 706, using the client computer system 704 submits service requests to the server computer system 702 via a throttling system. The throttling system receives the service requests into a service-request queue. The throttling system processes the service requests and adjusts a throttling bucket 708 in accordance with a set of operational parameters associated with the throttling system. The rate and sequence with which service requests are forwarded from the throttling system to the server computer system for fulfillment may be altered by the throttling system based at least in part on a level of the throttling bucket 708. The level of the throttling bucket 708 may be modified based on a number of bucket-fill events and bucket-drain events.

A set of throttling bucket-fill events 710 are processed by the throttling system into a number of bucket filling components. The bucket filling components may be modified by one or more fill factors 712. The modified bucket filling components are added to a time-based recovery component, and added to the level of the throttling bucket 708. The one or more fill factors may be modified based at least in part on risk-mitigating factors provided by the server computer system 702. In one example, the server computer system 702 provides a time-based fill factor for a particular type of request to the throttling system that provides an increased fill factor when service requests are received with preferred security protocols. Service requests received by the throttling system with preferred security protocols are subjected to the increased fill factor, and as a result, the level of the throttling bucket 708 is increased to a greater amount outside expected working hours. A particular fill factor of the one or more fill factors 712 may be applicable to one or more of the bucket filling components. Particular fill factors may be applicable to particular types of service requests received by throttling system, or to service requests with particular parameters or characteristics.

A set of throttling bucket-drain events 714 is processed by the throttling system into a number of bucket draining components. The bucket draining components are modified by one or more drain factors 716. The modified bucket draining components are subtracted from the level of the throttling bucket 708. The one or more drain factors can be modified at least in part on risk-aggravating factors provided by the server computer system 702. In one example, the server computer system 702 provides a time-based drain factor for a particular type of request to the throttling system that provides an increased drain factor, and as a result, the level of the throttling bucket 708 is decreased by a greater amount outside expected working hours. Particular drain factors of the one or more drain factors 716 can be applicable to particular types of service requests, requests having particular parameters, or other characteristics.

In some implementations, a request sent by the client computer system is received by the throttling system. The request is analyzed by the throttling system, and based at least in part on risk-mitigating factors and risk-aggravating factors supplied by the server computer system 702, the throttling system determines applicable fill factors and drain factors for the request. A throttling metric is determined for the request, and the throttling metric is multiplied by the difference between the applicable fill factor and the drain factor to produce a net bucket level change. If the net bucket level change would cause the level of the throttling bucket 708 to decline below zero, the request is returned to the request queue in the throttling system until the level of the throttling bucket 708 recovers. If the net bucket level change would cause the level of the throttling bucket 708 to exceed the maximum bucket size, the level of the throttling bucket 708 is set to the maximum bucket size.

Figure 8:
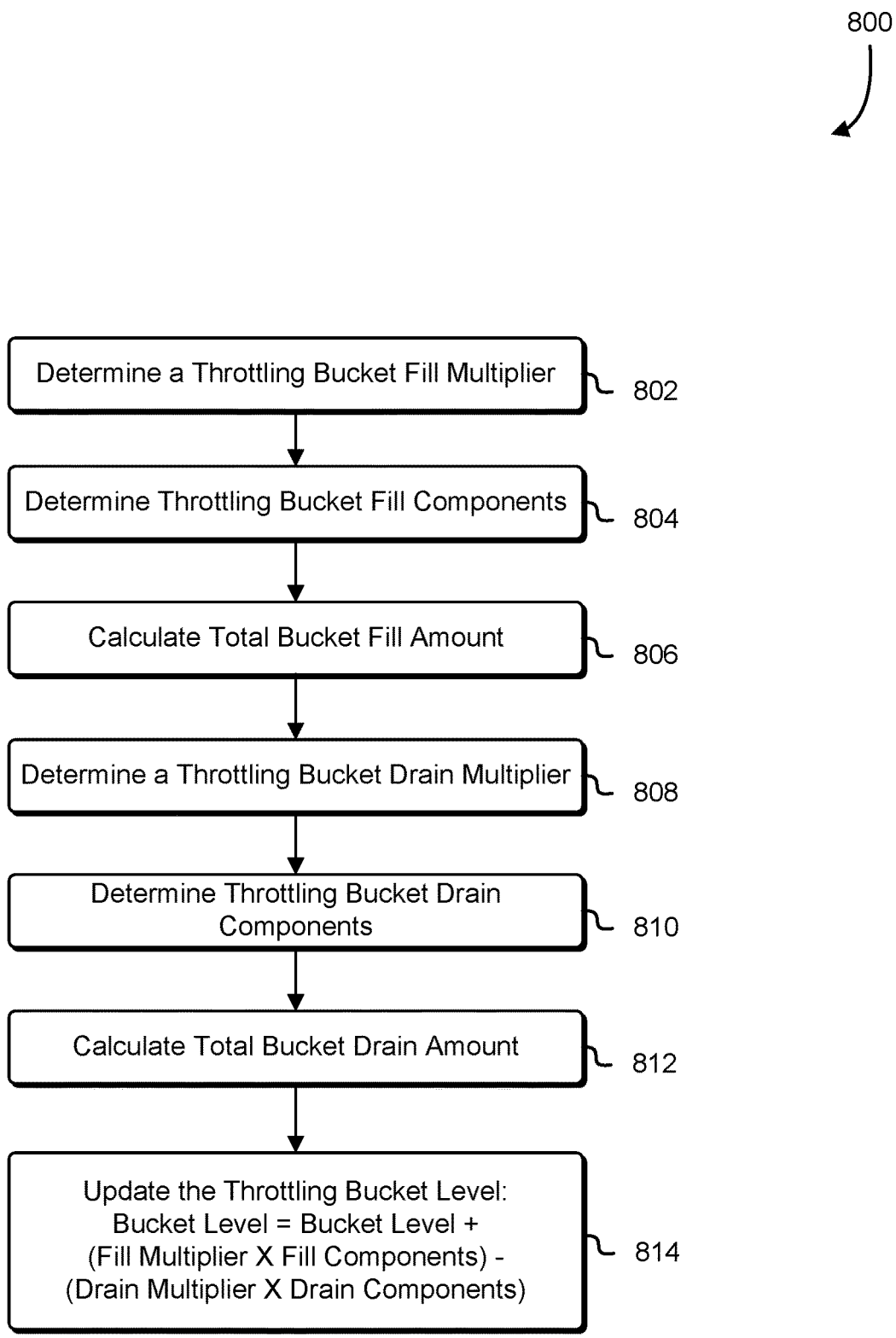
FIG. 8 shows an illustrative example of a process that, as a result of being performed by a service, updates a throttling bucket level based at least in part on a number of risk-mitigating and risk-aggravating factors.

FIG. 8 shows an illustrative example of a process that, as a result of being performed by a service, updates a throttling bucket level based at least in part on a number of risk-mitigating and risk-aggravating factors. A flowchart 800 shows a process that begins at block 802 with a throttling system determining a throttling bucket fill multiplier. The throttling bucket fill multiplier may be based at least in part on a set of risk-mitigating factors such as the use of improved security protocols, the use of strong passwords and cryptographic keys when submitting requests, and requests that conform to previous patterns of requests. At block 804, the throttling system determines a number of throttling bucket fill components. The throttling bucket fill components may include the submission of authentication credentials from the requester, the receipt of a confirmation from an account manager, a time-based recovery event, or the presence of corroborating service requests. For each throttling bucket fill components, the throttling system determines a throttling metric. At block 806, the throttling metric of each throttling bucket fill component is multiplied by the throttling bucket fill multiplier to create a total bucket fill amount.

At block 808, the throttling system determines a throttling bucket drain multiplier. The throttling bucket drain multiplier may be based at least in part on a set of risk-aggravating factors such as the presence of failed login attempts, the use of insecure security protocols, and the submission of requests outside normal working hours or from unexpected geographic locations. At block 810, the throttling system determines a number of throttling bucket drain components. For each throttling bucket drain components, the throttling system determines an associated throttling metric. The throttling bucket drain events may include events associated with the fulfillment of service requests by the service, failed login attempts, or attempts to access tripwire data. At block 812, the throttling metric of each throttling bucket drain event is multiplied by the throttling bucket drain multiplier to create a total bucket drain amount.

The throttling system updates 814 the level of the throttling bucket as follows. The current bucket level is retrieved from the throttling system, and a total bucket modification is determined by subtracting the total bucket drain amount from the total bucket fill amount. If adding the total bucket modification to the current bucket level would exceed the maximum level of the throttling bucket, the throttling bucket is set to the maximum level of the throttling bucket. If adding the total bucket modification to the current bucket level would result in a throttling bucket level of less than zero, the level of the throttling bucket is not changed and a message is sent to the throttling system that causes the throttling system to pause the forwarding of service requests to the service. If adding the total bucket modification to the current bucket level results in a throttling bucket level greater than or equal to zero, and less than or equal to the maximum level of the throttling bucket, then the total bucket modification is added to the current bucket level.

Figure 9:
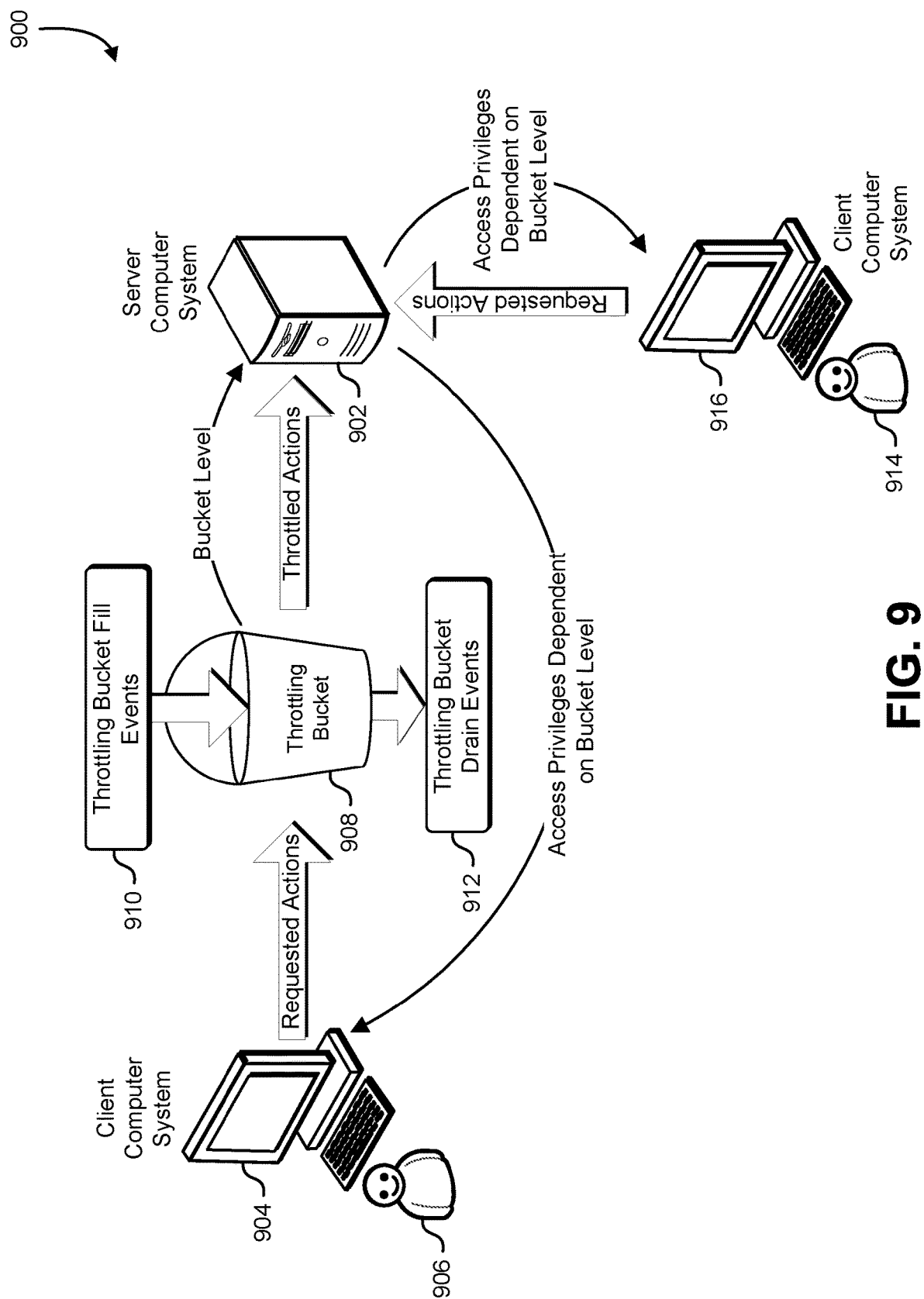
FIG. 9 shows an illustrative example of a throttling system that modifies access privileges granted to a client based at least in part on a level of a throttling bucket.

FIG. 9 shows an illustrative example of a throttling system that modifies access privileges granted to a client based at least in part on a level of a throttling bucket. System 900 includes a server computer system 902 that provides a service to a client computer system 904 operated by an authorized user 906. The authorized user 906 submits service requests via the client computer system 904 to the service via a throttling system. The throttling system implements a throttling bucket 908. The throttling bucket has an associated bucket level maintained within a range of zero to a maximum bucket size. A collection of throttling bucket fill events 910 cause the level of the throttling bucket 908 to be increased. A collection of throttling bucket drain events 912 cause the level of the throttling bucket 908 to be decreased. An access control system on the server computer system 902 authorizes service request by authenticating the identity of a requester. For example, if the authorized user 906 submits a request by the client computer system 904, the authorized user 906 may submit the username and password, digital certificate, a biometric value, or other identifying information with the request. The server computer system 902 verifies the identifying information to confirm the identity of the authorized user 906. Based at least in part on the identifying information, a set of access privileges are granted to the authorized user 906.

In the example shown in FIG. 9, the server computer system 902 retrieves the bucket level from the throttling system, and the access privileges granted to the authorized user 906 are based at least in part on the level of the throttling bucket 908. In some examples, as the level of the throttling bucket 908 decreases, the access privileges granted to the authorized user 906 by the server computer system 902 are decreased. In another example, as the level of the throttling bucket 908 decreases, the access privileges granted to another authorized user 914 are modified.

In some examples, access privileges may be adjusted upwards or downwards in response to the level of the throttling bucket 908. In one example, the authorized user 906 submits service requests via the client computer system 904 to the server computer system 902. As the authorized user 906 submits increasing numbers of service requests, the level of the throttling bucket 908 decreases. If the level of the throttling bucket 908 decreases below a threshold value, thereby indicating that the authorized user 906 is becoming overloaded, the server computer system 902, based at least in part on the level of the throttling bucket 908, increases access privileges granted to the other authorized user 914. The other authorized user 914 uses the increased access privileges to submit service requests to the server computer system 902 via another client computer system 916, thereby offloading the workload of the authorized user 906. If the authorized user 906 submits a lower number of service requests, the level of the throttling bucket 908 may recover, and the additional access privileges granted to the other authorized user 914 may be revoked. In this way, access privileges may be automatically increased and decreased based on information collected using the throttling system.

Figure 10:
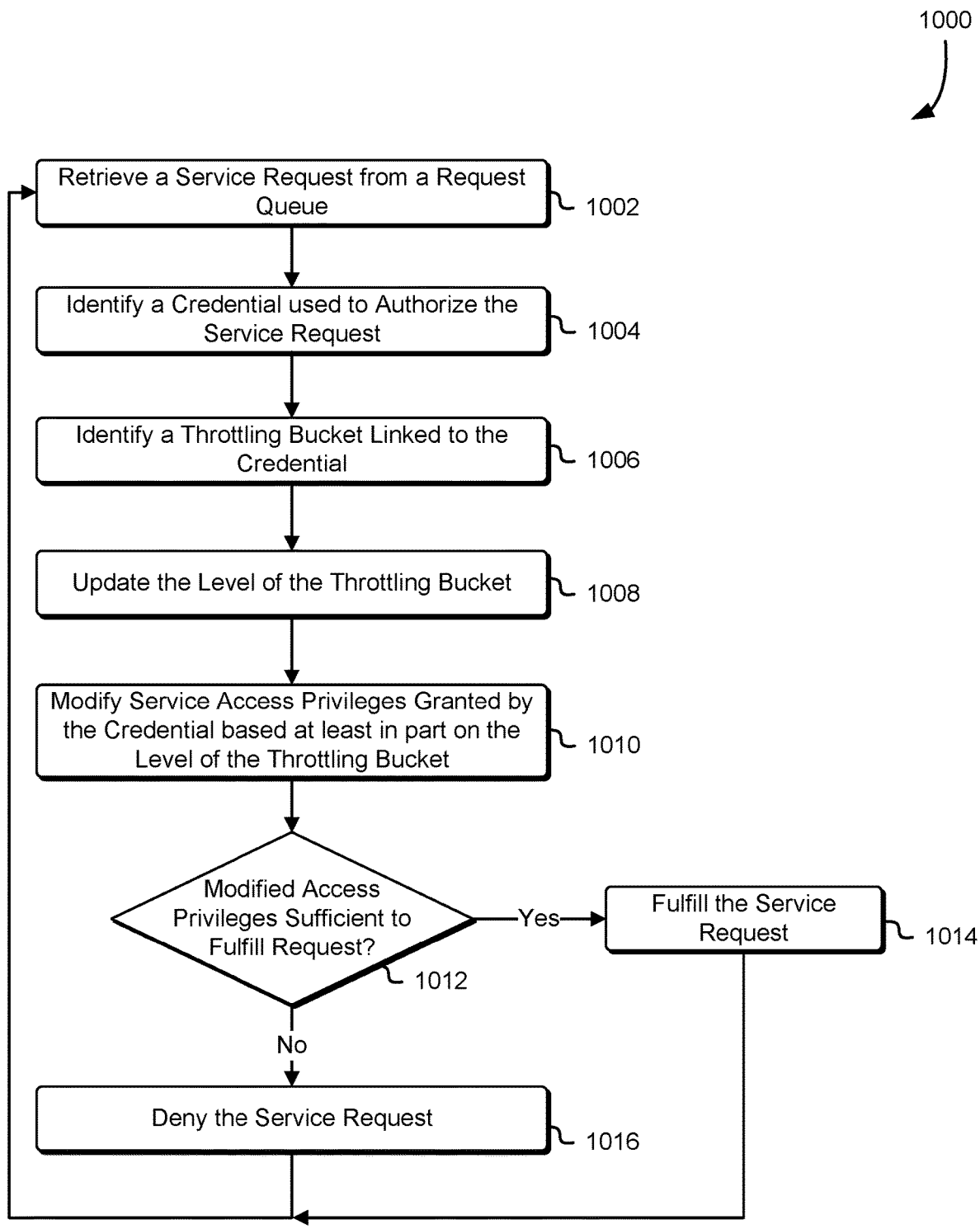
FIG. 10 shows an illustrative example of a process that, as a result of being performed by a service, modifies privileges granted to a client based on a level of a throttling bucket.

FIG. 10 shows an illustrative example of a process that, as a result of being performed by a service, modifies privileges granted to a client based on a level of a throttling bucket. The flowchart 1000 illustrates a process that begins at block 1002 were throttling system receives a service request from a request queue. The request queues are maintained by the throttling system and retain service requests submitted to the service by authorized users. At block 1004, the throttling system identifies a credential used to authorize the service request. The credential is authenticated by the service. The throttling system identifies 1006 a particular throttling bucket associated with service requests submitted with the credential, and at block 1008, the throttling system updates the level of the particular throttling bucket to account for pending requests, fill and drain events, and periodic time-based bucket level restoration.

At block 1010, the service, based at least in part on the level of the particular throttling bucket, modifies the access privileges which are associated with the credential used to authorize the service request. In some examples, the privileges granted by the credential are increased as the level of the throttling bucket increases, and decreased as the level of the throttling bucket decreases. In another example, the privileges granted by the credential are decreased as the level of the throttling bucket increases, and increased as the level of the throttling bucket decreases. In yet another example, the privileges granted by the credential are increased when the level of the throttling bucket exceeds an upper threshold, and the privileges granted by the credential are decreased when the level of the throttling bucket declines below a lower threshold.

At decision block 1012, the service determines whether the modified privileges are sufficient to fulfill the pending service request. If the modified privileges are sufficient to fulfill the pending service request, execution proceeds to block 1014 and the service request is fulfilled by the service. If the modified privileges are not sufficient to fulfill the service request, execution proceeds to block 1016 and the service denies the service request. In some implementations, the service returns the service request to a service request queue maintained by the throttling system. In another implementation, the service places the service request in a service request queue maintained by the service itself, and reevaluates whether to fulfill the request if the privileges associated with the request are increased at a later time.

Figure 11:
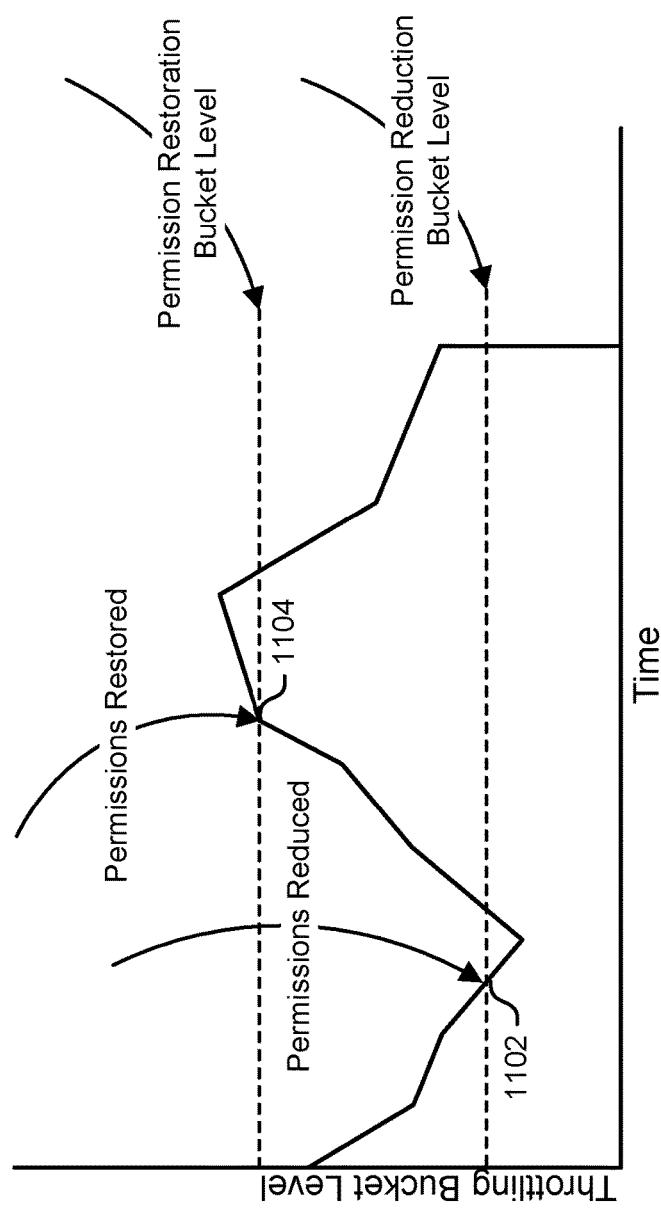
FIG. 11 shows an illustrative example of a throttling bucket level over time, which causes service access privileges to be reduced when the throttling bucket level falls below a lower threshold, and restored when the throttling bucket level exceeds a higher threshold.

FIG. 11 shows an illustrative example of a throttling bucket level over time, which causes service access privileges to be reduced when the throttling bucket level falls below a lower threshold, and restored when the throttling bucket level exceeds a higher threshold. A chart 1100 shows a level of an associated throttling bucket over a period of time. During a first portion of time, the level of the throttling bucket declines until the level of the throttling bucket drops below a permission reduction bucket level at a first point 1102. As a result of the throttling bucket level dropping below the permission reduction bucket level, a service reduces the amount of permissions granted to a particular set of credentials. As the level of the throttling bucket increases, and exceeds the permission reduction bucket level, the permissions associated with the particular set of credentials are not changed. The level of the throttling bucket increases until the level of the throttling bucket exceeds the permission restoration bucket level at point 1104. As a result of the level of the throttling bucket exceeding the permission restoration bucket level, the permissions associated with the credentials are restored. The permission reduction bucket level and the permission restoration bucket level provide an amount of hysteresis when controlling the amount of permissions granted to a particular credential.

Figure 12:
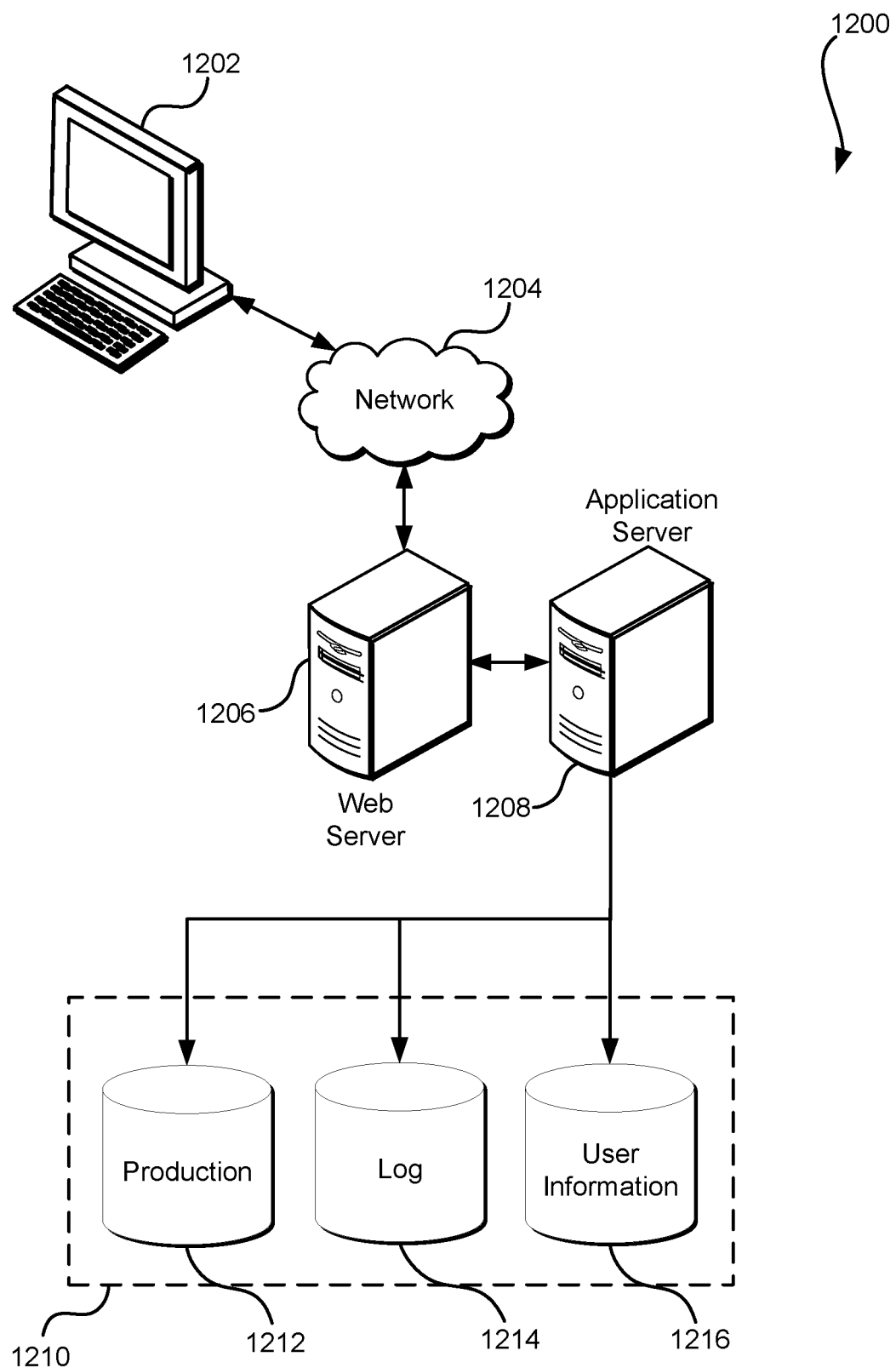
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, from an administrator associated with a service account, a set of throttling parameters;
configuring a throttling service based at least in part on the set of throttling parameters, the set of throttling parameters implemented as an initial set of throttling parameters of the service account;
receiving, from a requester associated with the account, at a server computer system that provides a service and the throttling service, a service request and a credential associated with the service request;
determining a throttling metric for the service request based at least in part on the set of throttling parameters;
identifying a throttling bucket that is associated with the service request and a level of the throttling bucket maintained by the throttling service between a lower bound and an upper bound;
updating the level of the throttling bucket to an updated level based at least in part on a time-based recovery component of a set of bucket filling parameters and the throttling metric of a set of bucket draining parameters; and
constraining a rate at which service requests are processed by a service based at least in part on the updated level of the throttling bucket and the set of throttling parameters.

2. The computer-implemented method of claim 1, further comprising modifying, based at least in part on the updated level of the throttling bucket, a set of access privileges granted to the requester by the credential.

3. The computer-implemented method of claim 1, further comprising:
modifying the updated level based at least in part on a type of credential associated with the service request, where the type of credential is a member of the set of bucket filling parameters and the set of bucket draining parameters.

4. The computer-implemented method of claim 1, wherein the set of throttling parameters includes at least one of a bucket size, a bucket-fill multiplier, a bucket-drain multiplier, and a bucket recovery rate.

5. A system, comprising a server computer system comprising a hardware processor and memory storing executable instructions that, as a result of being executed by the hardware processor, cause the server computer system to:
receive, from an administrator of a service account, a set of throttling parameters;
implement the set of throttling parameters as an initial set of throttling parameters for the service account;
determine a throttling metric associated with a service request received from a client computer system associated with the service account;
update a bucket level to an updated bucket level based at least in part on the throttling metric, a bucket filling parameter, and bucket draining parameter, the bucket level associated with a throttling bucket maintained by an associated throttling system, the bucket filling parameter indicating a first event that causes the throttling system to increase the bucket level and the bucket draining parameter indicating a second event that causes the throttling system to decrease the bucket level;
generate a determination to fulfill the service request based at least in part on the updated bucket level being above a lower bound; and as a result of generating the determination, allow the service request to be fulfilled.

6. The system of claim 5, wherein the memory further stores instructions that, as a result of being executed by the hardware processor, cause the server computer system to generate a second determination not to fulfill the service request based at least in part on the updated bucket level being below the lower bound; and as a result of generating the second determination, place the service request in a queue maintained by the server computer system.

7. The system of claim 5, wherein the memory further stores instructions that, as a result of being executed by the hardware processor, cause the server computer system to:

determine a schedule associated with a requester that submitted the service request to the server computer system, where the schedule is a member of the first set of events; and modify the bucket level based at least in part on the schedule.

8. The system of claim 5, wherein the memory further stores instructions that, as a result of being executed by the hardware processor, cause the server computer system to:

determine a geolocation of the client computer system, where the geolocation of the client computer system is a member of the first set of events; and modify the bucket level based at least in part on the geolocation of the client computer system.

9. The system of claim 8, wherein the memory further stores instructions that, as a result of being executed by the hardware processor, cause the server computer system to:

identify a mobile device associated with a requester of the service request;

determine a geolocation of the mobile device;

determine the geolocation of the mobile device matches the geolocation of the client computer system; and as a result, increase the bucket level.

10. The system of claim 5, wherein the memory further stores instructions that, as a result of being executed by the hardware processor, cause the server computer system to:

determine that tripwire data was accessed as a result of fulfilling the service request, the tripwire data is a member of the second set of events; and as a result of determining that tripwire data was accessed, reduce the bucket level of the throttling bucket.

11. The system of claim 5, wherein the memory further stores instructions that, as a result of being executed by the hardware processor, cause the server computer system to:

receive, from an account manager associated with the service request, a confirmation of the service request, where the confirmation is a member of the first set of events; and as a result of receiving the confirmation of the service request, increase the bucket level.

12. The system of claim 5, wherein the memory further stores instructions that, as a result of being executed by the hardware processor, cause the server computer system to:

receive a corroborating service request from another client computer system, where the corroborating service request is a member of the first set of events; and as a result of receiving the corroborating service request, increase the bucket level.

13. A non-transitory computer-readable storage medium storing thereon executable instructions that, as a result of being executed by one or more processors of a computer system, cause the computer system to at least:

receive, from an administrator of a service account, a set of throttling parameters;

implement the set of throttling parameters for the service account;

determine a throttling metric for a first service request received from a first client, the first client associated with the service account;

determine a level of a throttling bucket based at least in part on a set of bucket modifying parameters, the set of bucket modifying parameters indicating a set of events that causes the level of the throttling bucket to be modified;

modify, based at least in part on the throttling metric of the first service request, the level of the throttling bucket to generate a modified level of the throttling bucket;

receive a second service request from a second client; and determine to fulfill the second service request based at least in part on the modified level of the throttling bucket being above a lower bound of the throttling bucket.

14. The non-transitory computer-readable storage medium of claim 13, wherein the instructions that cause the computer system to determine the throttling metric for the first service request further comprise instructions that, as a result of being executed by the one or more processors, cause the computer system to determine the throttling metric for the first service request by at least:

determining a base metric, a parameter metric, and a result metric for the first service request based at least in part on a type of the first service request; and determining the throttling metric for the first service request by adding the base metric to at least:

a combination of the parameter metric and a characteristic of a parameter associated with the first service request; and a combination of the result metric and a characteristic of a result produced by fulfilling the first service request.

15. The non-transitory computer-readable storage medium of claim 13, wherein the instructions further comprise instructions that, as a result of being executed by the one or more processors, cause the computer system to:

determine that the modified level is greater than or equal to the throttling metric associated with the first service request; and as a result, cause the first service request to be fulfilled.

16. The non-transitory computer-readable storage medium of claim 13, wherein the instructions further include instructions that, as a result of being executed by the one or more processors, cause the computer system to:

determine that the modified level of the throttling bucket is less than the throttling metric associated with the first service request; and as a result, store the first service request in a request queue.

17. The non-transitory computer-readable storage medium of claim 13, wherein the instructions further include instructions that, as a result of being executed by the one or more processors, cause the computer system to:

modify a set of service-access privileges to produce a modified set of service-access privileges based at least in part on the modified level of the throttling bucket; and wherein the instructions that cause the system to determine to fulfill the second service request further include instructions that, as a result of being executed by the one or more processors, cause the computer system to determine to fulfill the second service request based at least in part on the modified set of service-access privileges.

18. The non-transitory computer-readable storage medium of claim 13, wherein the instructions further include instructions that, as a result of being executed by the one or more processors, cause the computer system to modify, based at least in part on the modified level of the throttling bucket, a level of a second throttling bucket.

19. The non-transitory computer-readable storage medium of claim 13, wherein the instructions further include instructions that, as a result of being executed by the one or more processors, cause the computer system to multiply the throttling metric of the first service request by a drain factor, the drain factor provided by a service and based at least in part on a processing load of the service.

20. The non-transitory computer-readable storage medium of claim 17, wherein the instructions that cause the computer system to modify the set of service access privileges further include instructions that, as a result of being executed by the one or more processors, cause the computer system to:
   increase the service-access privileges as a result of the modified level of the throttling bucket exceeding an upper threshold value; and
   decrease the service-access privileges as a result of the modified level of the throttling bucket falling below a lower threshold value.

\* \* \* \* \*